Sept. 8, 1936.                J. HALTENBERGER                2,053,869
                           INDEPENDENT WHEEL SPRINGING
                    Filed May 28, 1932         3 Sheets-Sheet 1
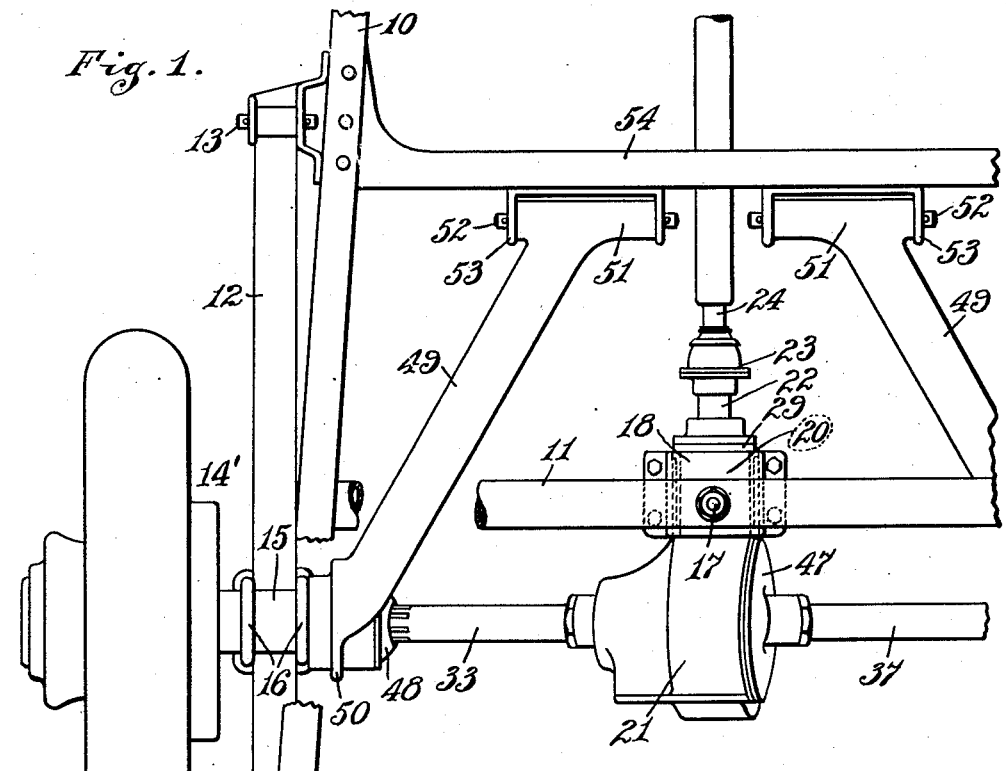
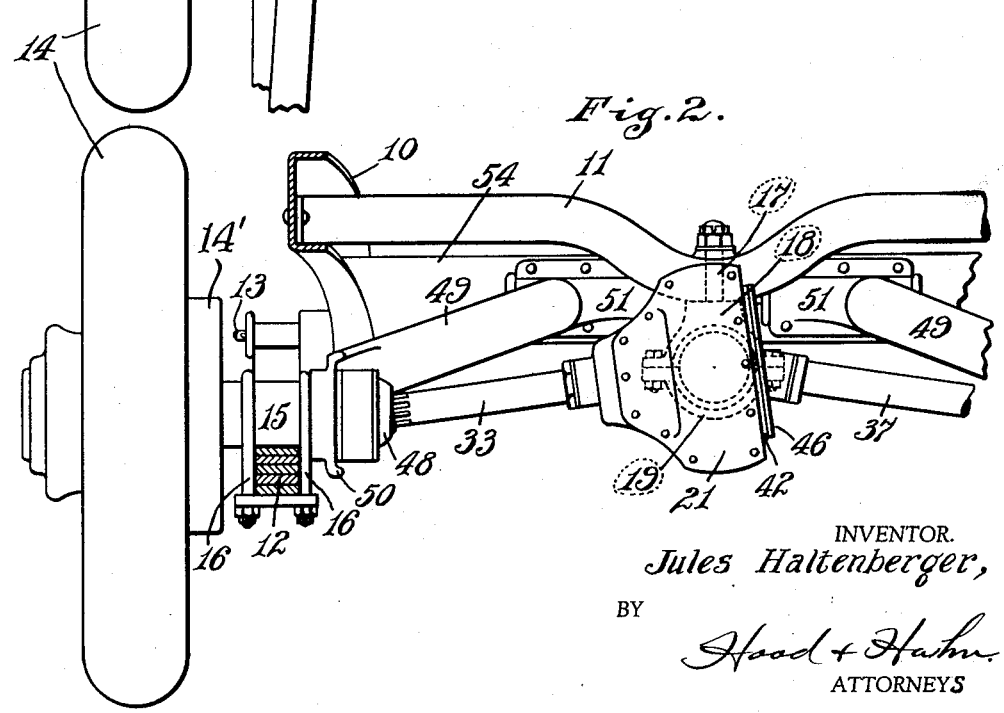
INVENTOR.
Jules Haltenberger,
BY
Hood + Hahn
ATTORNEYS

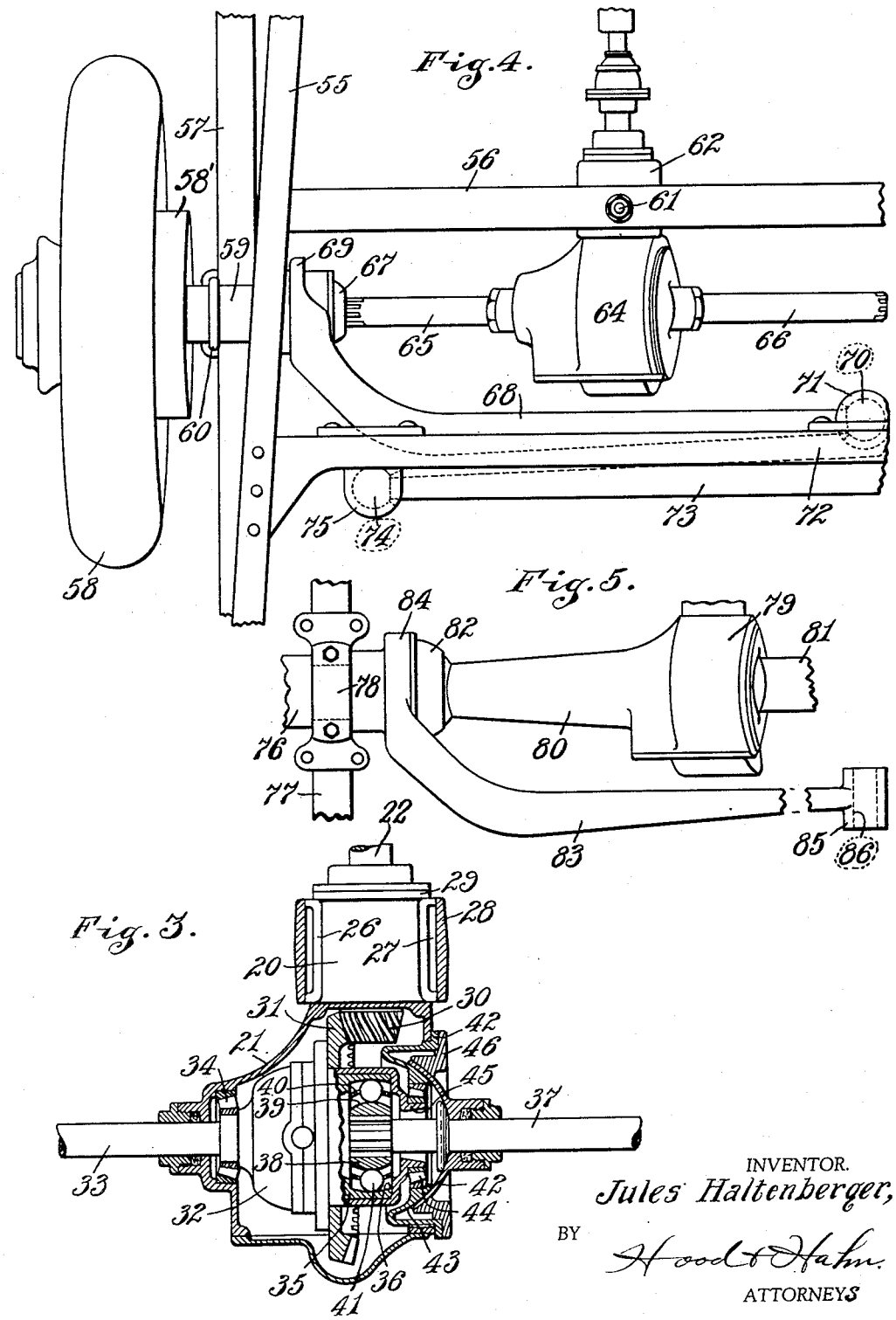

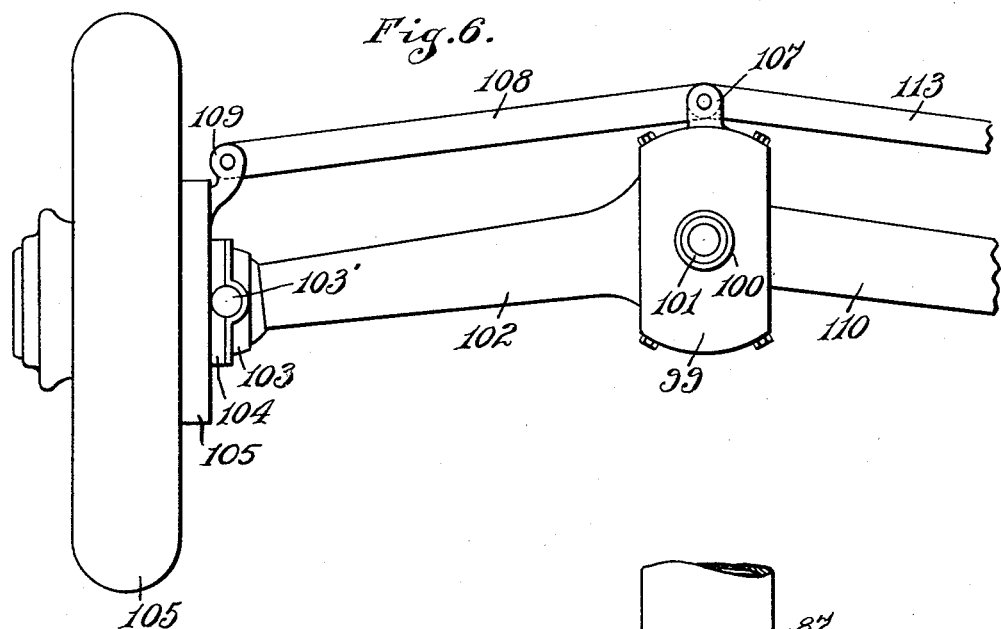
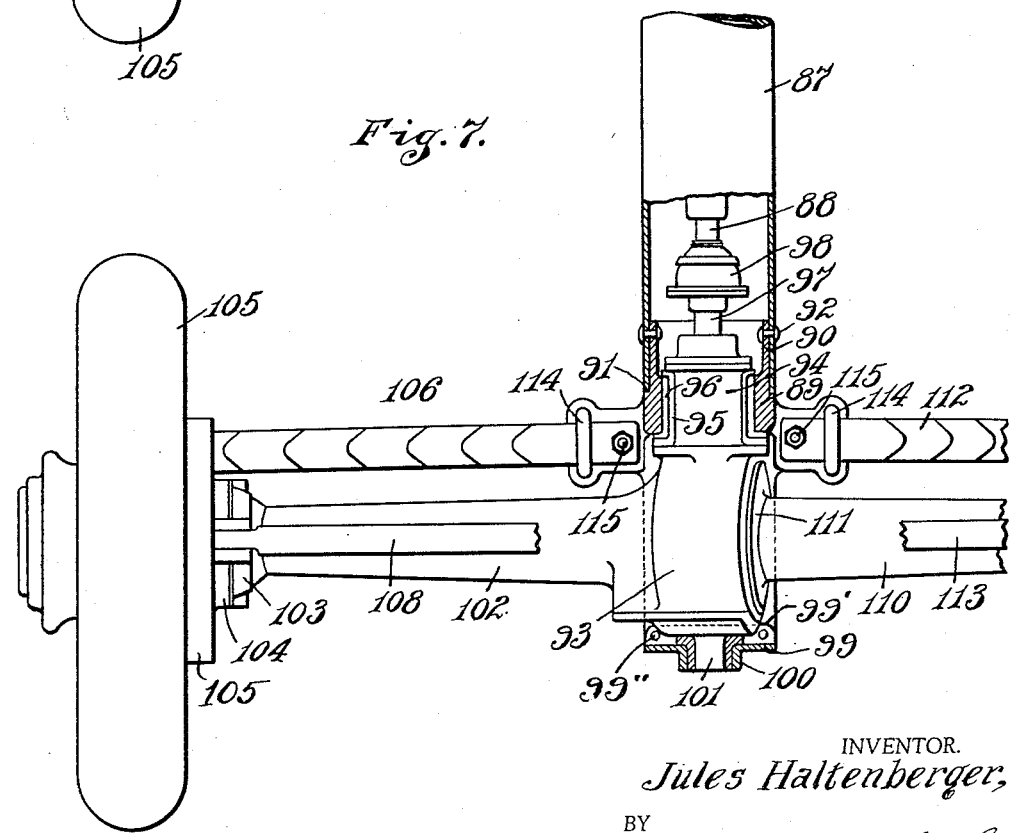

Patented Sept. 8, 1936

2,053,869

UNITED STATES PATENT OFFICE 2,053,869

INDEPENDENT WHEEL SPRINGING

Jules Haltenberger, Indianapolis, Ind.

Application May 28, 1932, Serial No. 614,089

21 Claims. (Cl. 180—73)

The present application relates to a system of independent wheel suspension for an automotive vehicle, and an object of the invention is to provide a device of the type described which shall be of such character that tread variation due to the swinging of the wheel-supporting elements shall be reduced to a desired minimum; and, with regard to some, at least, of the embodiments of my invention, that such tread variation shall be completely eliminated.

A further object of the invention is to provide a device of the type described wherein only three universal joints are required in the driving train between the two driving wheels.

A further object of the invention is to reduce the cost of independently sprung driving wheel organizations by eliminiating from such organizations one of the four universal joints almost universally used prior to the present invention.

A further object of the invention is to provide a system of independently sprung driving wheels for automotive vehicles in which, while coplanar, parallel, or hinged wheel motion resulting from flexure of the springs is retained, the driving angle of the articulated shafts is materially reduced as compared to known practice. I use the word "coplanar" in speaking of systems in which spring flexure does not move the wheel out of its normal plane; and I use the term "parallel" in speaking of systems in which the wheel moves as a result of spring flexure, but is held always parallel with its normal plane. I use the word "hinged" in speaking of suspensions in which spring flexure results in movement of the wheel in an arc having its center located between two associated wheels. When such center is midway between the two wheels, the term "center hinged" will be used; when the radius is shorter than one-half the distance between the two wheels, the term "short hinged" will be used; and when the radius is longer than one-half such distance, the term "long hinged" will be used.

A further object of the invention is to provide, in connection with that type of vehicle the frame of which consists of a tubular back bone extending longitudinally, a system of independently sprung differentially driven drive wheels of such character that the parts of the drive mechanism including the differential and the drive shafts may be easily and quickly opened to inspection or repair or modification.

A further object of the invention is to provide, in a vehicle of the type just described, a drive assembly including a differential mechanism, drive shafts, drive wheels, shaft housings, and tie members for said housings, such assembly being readily removed bodily from the vehicle for inspection or repair of the elements of such assembly.

A further object of the invention is to provide a system of independently sprung wheels for an automotive vehicle in which the wheels are carried by standard semi-elliptic springs conforming in every respect to present day practice, and are guided by said springs in conjunction with rocking arms; such arms taking any one of several forms, as will be more particularly pointed out hereinafter.

A further object of the invention is to provide an independently sprung wheel organization for vehicles in which the motion of a wheel consequent upon flexure of the associated spring is confined to an arc having a radius greater than half the tread of the vehicle.

A further object of the invention is to provide a vehicle driving system, preferably of the independently sprung drive wheel type, wherein the differential mechanism is supported upon the vehicle frame through the medium of a cushion or sleeve of resilient material of comparatively low renitence.

A further object of the invention is to provide a system of independently sprung drive wheels of such character as to be readily applied to existing vehicle structures without material modifications of such structures.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a broken plan view of a vehicle chassis illustrating one embodiment of the present invention;

Fig. 2 is an elevation of the same;

Fig. 3 is a horizontal sectional view through the differential mechanism and associated elements used, without substantial modification, in all of the embodiments of my invention disclosed herein;

Fig. 4 is a view similar to Fig. 1 but illustrating a modified form of wheel guiding means;

Fig. 5 is a fragmentary plan view of a still further modified form of wheel guiding means;

Fig. 6 is an elevation of a further embodiment of the present invention; and

Fig. 7 is a plan view, partially in section, of the mechanism illustrated in Fig. 6.

Referring more particularly to the drawings, and specifically to Figs. 1, 2, and 3, it will be seen that I have illustrated a portion of a vehicle frame indicated generally at 10 and including a transverse cross member 11. The usual semi-elliptical springs 12 are suitably mounted on the frame, their front ends being secured to the frame through the medium of fulcrums 13 of any desired and ordinary type and, obviously, of such strength as to transmit to the frame the braking effort exerted by the usual brakes.

Wheels 14, carrying brake drums 14' associated with the usual braking mechanism (not shown) are suitably mounted upon wheel-supporting units 15 of any desired type, and are carried upon the springs 12 in any desired manner, being secured thereto, for instance, by the U-bolts 16 of ordinary type. Driving shafts are, of course, housed within the units 15.

A bolt or pin 17 preferably passes through the cross member 11, substantially centrally thereof, and suitably supports one element 18 of a clamp or collar, said clamp being made up of said element 18 and a mating element 19 adapted suitably to receive therebetween a neck 20 formed upon or carried by a differential housing 21. A short shaft 22 is journalled in said neck 20 and is connected, through the medium of a universal joint 23, to the usual propeller shaft 24.

I prefer to mount the neck 20 of the differential housing 21 within the clamp 18—19 in the following manner:—I provide two semi-cylindrical metallic members 27, each of which carries, upon its inner surface, a sheath of rubber or other resilient material of low renitence vulcanized thereon. As is clearly shown in Fig. 3, the rubber sheaths 26 are of channel shaped cross section, being provided with lips overlying the end surfaces of the metallic members 27. The compound elements 26—27 are received upon, and embrace, the neck 20 of the differential housing 21; and a collar 28, which is preferably tapered from its center toward each end, is sleeved over said composite elements to hold the same in position. The collar 28 is received in and held in place by the clamp 18—19, the elements thereof being shaped to cooperate with the surfaces of the collar 28 to hold the same against axial movement.

It will be seen that the composite elements 26—27 are held upon a reduced portion of the neck 20 between a shoulder formed at the juncture of said neck and the housing proper and a flange 29 formed at the free end of said neck; and it will further be seen that, when the collar 28 is mounted in the clamp 18—19, the differential housing 21 is firmly secured to the vehicle frame, but is carried in a cushion of resilient material, said housing being capable of free oscillation about the axis of its neck 20 and having no binding metal-to-metal contact with any portion of the frame. Obviously, as a result of this arrangement, the housing 21 is capable of limited universal movement with respect to said frame; and vibration and noise will not be transmitted, to any appreciable extent, from the differential mechanism to the frame.

The shaft 22 carries, within the housing 21, a pinion 30 with which meshes the ring gear 31 of the differential mechanism 32.

A shaft 33 is journalled in a suitable bearing 34 within the housing 21, and said shaft 33 is rigidly held against any angular movement with respect to the housing 21 except rotation about its own axis. The shaft 33 is operatively connected to an element of the differential mechanism 32.

Another element 35 of the differential mechanism 32 is suitably formed with a plurality of axially extending radiused grooves 36. A second shaft 37 carries, at its inner end, and within the housing 21, an element 38 externally formed with a like number of radiused grooves 39 adapted to register with the grooves 36. A cage or keeper 40 carries a plurality of balls 41, said balls being received in said grooves 36 and 40, whereby a driving connection is provided between the element 35 and the shaft 37, such connection being of such character as to permit limited universal movement on the shaft 37 with respect to said element 35 and the housing 21.

The end of the housing 21 through which the shaft 37 projects is closed in the following manner:—An element 42 is secured to said end of the housing 21 and is formed to project inwardly into said housing, said element 42 being formed with an externally convex flange 43. Said flange, incidentally, supports an anti-friction bearing 44 in which one end 45 of the differential mechanism 32 is journalled. A plate 46 is secured to the element 42 and the housing 21, said plate 46 being formed with an internally concaved portion, the concave surface of said element 46 corresponding to the convex flange 43 and being spaced slightly therefrom. A part-spherical element 47 is received in the space between the flange 43 and the concave surface of the plate 46, said element 47 forming a sealing bearing for the shaft 37.

The outer end of the shaft 33 is splined to receive one element of a universal joint 48 whereby said shaft is operatively connected to the shaft within the wheel-supporting unit 15. A link or swinging arm 49 is formed at its one end with a collar 50 rigid with said wheel-supporting unit 15 and forming a bearing for said universal joint 48. The opposite end 51 of said link 49 is fulcrumed upon a pin 52 mounted in a bracket 53 carried by a cross member 54 secured to the vehicle frame 10.

The outer end of the shaft 37 is similarly connected to its driving wheel, and said shaft 37 and its driving wheel are similarly braced by a second link 49 similarly fulcrumed on the element 54. In vehicles wherein the fulcrums 13 are mounted in rubber bushings, the fulcrum pins 52 are preferably likewise mounted.

It will be seen that the fulcrum pins 52 are positioned above and to the rear of the fulcrums 13. The optimum positions of these pins 52 have been carefully calculated, and each of said pins is aligned with the effective axis of flexure of its associated spring. That is, each pin 52 is aligned with the center of the arc which, in the absence of restraining means such as the link 49, would normally be described, upon spring flexure, by the center of the wheel-supporting unit mounted upon said spring.

From the above description, it will be seen that I have provided an organization including independently sprung wheels adapted to be driven through the medium of a differential mechanism, said differential mechanism being mounted upon the vehicle frame to oscillate freely about an axis substantially parallel with the longitudinal axis of the vehicle; and that said differential mechanism is further so mounted upon the frame as to permit limited universal movement of said differential mechanism with respect to the frame. It will also be seen that, because of such mounting of the differential mechanism, one universal joint, heretofore believed to be necessary in such systems, has been eliminated, while retaining the desirable feature of holding each driving wheel in its own plane throughout all positions of spring flexure. The fore parts of springs 12 do the driving through fulcrums 13 when this construction is used on a power axle as shown in Figs. 1 and 2. When the same construction is used on a dead or undriven axle, the fore parts of springs 12, through the fulcrums 13, pull such axle.

It will be seen, further, that the structure above described may be applied to a vehicle of standard construction by merely removing the standard rear axle assembly, attaching to the vehicle frame cross members 11 and 54, and assembling with the frame, as so modified, my improved driving assembly.

The mechanism illustrated in Fig. 4 differs somewhat from that illustrated in Figs. 1 and 2. The vehicle frame 55 includes a cross member 56, and carries the usual semi-elliptical springs 57 fulcrumed to the frame in the usual way to transmit the drive in the case of a power axle, or to locate a dead axle. Wheels 58 and brake drums 58' carried upon wheel-supporting members 59 are secured to said springs through the medium of the usual U-bolts 60. A bolt or pin 61 supports from said cross member 56 a collar 62 in which is received the neck of a differential housing 64. A cushion of rubber or other resilient material of low renitence is interposed between said collar and said neck, preventing metal-to-metal contact therebetween, and permitting limited universal movement of the housing 64 with respect to the frame. Such cushion may preferably be provided by a pair of the composite elements 26—27 illustrated in Fig. 3.

A pair of shafts 65 and 66, corresponding in all respects to the shafts 33 and 37 of Fig. 1 are operatively connected to separate elements of the differential mechanism enclosed within the housing 64, and the free end of each of said shafts 65 and 66 is splined to receive an element 67 of a universal joint, whereby said shafts are operatively connected to the shafts within the wheel-supporting units 59.

An arm 68 is provided at one end with a collar forming a bearing for the universal joint 67 associated with the shaft 65, and said collar is rigid with the corresponding wheel-supporting unit 59. At its opposite end, said arm 68 carries a ball 70 received in a ball socket 71 mounted upon a cross member 72 carried by the frame 55. A second arm 73 is provided at one end with a collar corresponding to the collar 69 and forming a bearing for the universal joint and rigid with the wheel-supporting unit associated with the shaft 66; and said arm 73 at its opposite end carries a ball 74 received within a ball socket 75 likewise supported upon the cross member 72. Preferably, the sockets 71 and 75 are mounted substantially in the normal horizontal plane of the wheel-supporting units 59.

It will be seen that the sockets 71 and 75 are materially spaced transversely from the longitudinal center line of the vehicle frame, each of the arms 68 and 73 crossing such center line. Obviously, the result of this arrangement is a long hinged suspension, or, in other words, an elongation of the radii of the arcs described by the wheels 58 upon spring flexure, with a consequent reduction of tread variation resulting from such flexure. Preferably, the sockets 71 and 75 will be spaced from their associated wheel-supporting units a distance as great as the construction of the vehicle frame will permit; but the essence of this phase of my invention is the provision of arms, such as the arms 68 and 73, of such character as to enforce movement of the wheels 58, upon spring flexure, in arcs having radii greater than half the normal tread of the vehicle.

In Fig. 5, I have illustrated a modification of the organization illustrated in Fig. 4 adapting such organization to use in those automotive vehicles wherein it is desired that the customary semi-elliptical springs shall not take the brake reaction, and wherein the wheel-supporting units are mounted for oscillation with respect to the springs. In said figure, I have shown a wheel-supporting unit 76 fulcrumed on a spring 77 through the medium of a split bearing 78. In this figure, also, I have shown a differential housing 79 having an integral, or rigidly attached, tubular extension 80 housing a shaft corresponding to the shafts 33 and 65 of Figs. 1 and 4, respectively. A second tubular extension 81 houses a shaft corresponding to the shafts 37 and 66 of Figs. 1 and 4 and is associated with the housing 79 through the medium of a part-spherical joint. The outer ends of the extensions 80 and 81 are associated with the wheel-supporting units 76 through the medium of part-spherical joints 82 enclosing universal joints through the medium of which the various housed shafts are operatively connected.

Arms 83 are provided with portions 84 rigidly connected to the wheel-supporting units 76, and forming bearings for the driving shafts; and at their opposite ends, said arms 83 are provided with hubs 85. Each of said hubs 85 is formed with a cylindrical bore 86 mounted to oscillate upon a pin rigidly carried by a cross member of the vehicle frame. Obviously, this arrangement will permit oscillation of the arms 83 only about the axes of the bores 86, and will prevent oscillation of the wheel-supporting units 76 with respect to the springs 77. Thus the brake reaction is taken by the pins upon which the arms 83 are mounted, instead of by the springs, as in the embodiments of Figs. 1 to 4 inclusive.

It will be apparent that the organizations of Figs. 4 and 5 are also of such character that they may be readily applied to vehicles of standard construction without material modification of the structure of such vehicles, whether such vehicles use the Hotchkiss drive or some sort of torque tube drive.

Referring, now, to Figs. 6 and 7, it will be seen that I have illustrated a vehicle of that type in which the frame consists solely of a tubular backbone 87. Such construction has been put into practical use, to some extent, in certain foreign cars.

In the application of the present invention to this type of vehicle, I provide a tubular back bone 87 which houses the usual propeller shaft 88. A shell, indicated generally at 89, is suitably secured to the rear end of the member 87, said shell being provided with a reduced extension 90 forming with the body of the shell a forwardly facing shoulder 91, said extension being received in the rear end of the tube 87 with said shoulder in abutment with the end of the tube, and being secured in place by suitable fastening means such as rivets 92, or the like.

The shell 89 is formed to enclose partially a differential housing 93 having a neck 94 received within a cylindrical portion of the shell 89, and spaced from said shell 89 by a cushion 95 of rubber or other resilient material of low renitence preferably vulcanized upon a pair of semi-cylindrical metallic members 96. Journalled in said neck is a shaft 97 connected, through the medium of a universal joint 98, with said propeller shaft 88.

A cap 99 closes the rear end of that portion of the shell 89 which partially encloses the housing 93, and said cap is formed with a bearing 100 receiving a trunnion 101 carried by the differential housing 93, thereby providing a supplemental point of support for said housing 93. The cap 99 is provided with ears 99' fitting within said shell portion and secured thereto by bolts 99'' or other equivalent fastening means.

A tubular extension 102, rigid with the housing 93, encloses a shaft, suitably connected to an element of the differential mechanism, and is connected, through a part-spherical joint 103, with a wheel-supporting unit 104 carrying a wheel 105 and brake drum 105'. Pins 103' transmit brake reaction between the extension 102 and the wheel-supporting unit 104, said pins preferably being coincident with the center of oscillation of the universal joint (not shown) connecting the shaft within the housing 102 with the wheel hub. Said wheel-supporting unit is mounted upon one end of a quarter elliptic spring 106, the inner end of said spring being secured to the shell 89 through the medium of a U-bolt 114 and a master bolt 115 in a well known manner.

The differential-enclosing portion of the shell 89 carries an upstanding bracket 107 to which is fulcrumed one end of a link 108, the opposite end of said link being fulcrumed to a bracket 109 carried by the wheel-supporting unit 104.

A second tubular extension 110 is associated with the differential housing 93 through the medium of a part-spherical joint 111 suitably keyed to said housing 93 to prevent rotation of said extension about its own axis, and said extension 110 houses a shaft operatively connected to an element of the differential mechanism, the outer end of said extension 110 being associated with a second wheel-supporting unit in the manner above described with respect to the extension 102. Said second wheel-supporting unit is mounted upon a spring 112 similar in all respects to the spring 106; and a link 113, similar in all respects to the link 108, links said second wheel-supporting unit to said bracket 107.

It will be seen that, as the springs 106 and/or 112 are flexed, the extensions 102 and/or 110 will oscillate about the axis of the neck 94 and, because of the provision of the links 108 and 113, the wheels 105 will be held always in planes parallel to their normal planes. A certain amount of tread variation will, of course, result from spring flexure, but that variation is materially reduced by the arrangement illustrated in Figs. 6 and 7. Since the neck 94 and the fulcrum 107 are located in the vertical longitudinally extending central plane of the vehicle, this suspension is of the center hinged parallelogram type.

It will also be seen that, as a result of the above-described association of elements, the whole rear axle assembly may be very easily removed from the vehicle. If, for any reason, it becomes necessary or desirable to inspect or repair any element of the assembly, the cap 99 is removed from the shell 89. The springs 106 and 112 are then disconnected from the shell 89, whereupon the whole drive assembly may be pulled rearwardly and so removed from the vehicle, it being understood, of course, that the universal joint 98 is simply splined to the shafts 88 and 97.

Alternatively, the fastening elements 92 may be removed, whereupon the complete assembly, including the shell 89, may be removed from the vehicle.

It will be obvious that, if desired, the joints 103 might be eliminated, thus doing away with the links 108 and 113, and converting the drive system into a center hinged axle type in which the wheels move in arcs centered at the center of the chassis.

To summarize, Figures 1 and 2 disclose structure which results in coplanar wheel motion controlled by the swinging arms 49 and the fulcrumed springs 12. Fig. 4 discloses structure resulting in long hinged arcuate movement of the wheels, the wheel supporting elements being mounted on, and positioned above, the upper surfaces of springs 57, and their movement being controlled by the long hinged arms or links 68 and 73 and the fulcrumed springs 57. In Fig. 5 is illustrated an organization similar to Fig. 4, but in which the long hinged arms 83 are so mounted as to take the brake reaction, said arms being capable of swinging only in a single plane. Figs. 6 and 7 illustrate structure which results in the center hinged parallelogram type of movement of the independently supported wheels.

All of these structures can be used with equal benefits for their specific purposes when the power axle is the front axle; and all of these structures can likewise be used with equal benefits for their specific purposes in the dead axle of an automobile; viz., in the front axle of a rear wheel drive, or in the rear axle of a front wheel drive.

In all constructions herein illustrated, the angular movement of the wheel-supporting unit control mechanism and the working angle of the wheel driving universal joints is materially less, for a given vertical wheel travel, than they would be if the usual short hinged construction were used.

I claim as my invention:

1. In an automotive vehicle having independently sprung drive wheels, a frame, a drive shaft for each of said wheels associated with said frame, a universal joint connecting each shaft to its wheel, differential mechanism, a universal joint connecting one only of said shafts to an element of said differential mechanism, the other of said shafts being directly connected to an element of said differential mechanism, and means associated with said wheels and operable to restrain each of said wheels to movement in planes parallel to its normal plane upon movement of said shafts about their points of association with said frame, said guide means for both of said wheels being centered at points spaced from their respective wheels a distance at least equal to one-half the tread of the vehicle.

2. In an automotive vehicle including a frame having independently sprung drive wheels, a drive shaft for each of said wheels associated with said frame, a universal joint connecting each shaft to its wheel, power transmitting means associated with said frame and operatively associated with said shafts, one only of said shafts being capable of limited universal movement with respect to said transmitting means, and means associated with said wheels and operable to restrain each of said wheels to movement in planes parallel to its normal plane upon movement of said shafts about their points of association with said frame, said guide means for both of said wheels being centered at points spaced from their respective wheels a distance at least equal to one-half the tread of the vehicle.

3. In an automotive vehicle, a frame, springs carried by said frame, wheel-supporting members carried by said springs, and a plurality of links each connected at one end to one of said wheel-supporting members and each fulcrumed at its opposite end on said frame, the fulcrum axis of each of said links being substantially perpendicular to the plane of its associated wheel, and being substantially aligned with the effective axis of flexure of its associated spring.

4. In an automotive vehicle, a frame, springs carried by said frame, wheel supporting members carried by said springs, a drive wheel supported on each of said wheel supporting members, a drive shaft for each of said wheels, a universal joint connecting each shaft to its wheel, power transmitting means fulcrumed on said frame and operatively associated with said shafts, one only of said shafts being capable of universal movement with respect to said transmitting means, and a plurality of links, each connected at one end to one of said wheel-supporting units and each fulcrumed at its opposite end on said frame, the fulcrum axis of each of said links being substantially aligned with the effective axis of flexure of the associated spring.

5. In an automotive vehicle, a frame, a pair of independently sprung wheels mounted on said frame, differential mechanism mounted on said frame for limited universal movement with respect to said frame, means including two universal joints operatively connecting an element of said differential mechanism to drive one of said wheels, and means including only one universal joint operatively connecting an element of said differential mechanism to drive the other of said wheels.

6. In an automotive vehicle, a frame consisting of a substantially central back bone, driving wheels independently sprung on said frame, power transmitting means mounted on said frame and connected to drive said wheels, and means including links associated with said frame and with said wheels to confine the movement of each of said wheels to substantially parallel planes, the fixed pivot points of said links being horizontally spaced from the vertical planes including the points of road contact of their respective wheels a distance at least equal to one-half the tread of the vehicle.

7. In an automotive vehicle, a frame consisting of a substantially central back bone, wheel-supporting units carried by said frame and swingable about axes located at the transverse center of said vehicle, wheels jointedly mounted on said wheel-supporting units, and center hinged means associated with said wheels and with said frame for holding said wheels, upon oscillation of said wheel-supporting units, substantially parallel to their normal planes.

8. In an automotive vehicle, a frame consisting of a substantially central back bone, wheel-supporting units carried by said frame and swingable about axes located at the transverse center of said vehicle, wheels jointedly mounted on said wheel-supporting units, and center hinged means associated with said wheels and with said frame and operable, upon oscillation of said wheel-supporting units, to effect relative angular movement of said wheels and the axes of said respective wheel-supporting units, whereby tread variation consequent upon oscillation of said wheel-supporting units is reduced.

9. In an automotive vehicle, a tubular back bone, springs independently connecting wheels to said back bone, power transmitting means mounted on said back bone, articulated shafts connecting said transmitting means to drive said wheels, respectively, and a plurality of links, each of said links being fulcrumed at one end on said back bone and in the vertical longitudinally central plane of said vehicle, and being fulcrumed at its other end on one of said wheels, and each of said links being positioned parallel with its associated wheel driving shaft.

10. In an automotive vehicle, a tubular back bone, springs independently connecting wheels to said back bone, a differential housing fulcrumed on said back bone, differential mechanism in said housing, drive shafts connected to said respective wheels through universal joints, a universal joint connecting one only of said shafts to an element of said differential mechanism, the other of said shafts being directly connected to an element of said differential mechanism, and a plurality of links, each fulcrumed at one end on said back bone and fulcrumed at its opposite end on one of said wheels.

11. In an automotive vehicle, a tubular back bone, a propeller shaft housed therein and carrying a pinion, springs independently connecting wheels to said back bone, a differential housing, differential mechanism in said housing and including an element meshing with said pinion, shafts connecting elements of said differential and said wheels, and means mounting said differential housing to oscillate substantially about the axis of said pinion, one only of said shafts being connected to its differential element through a universal joint.

12. In an automotive vehicle, a tubular back bone, a propeller shaft housed therein and carrying a driving element, springs independently connecting wheels to said back bone, a differential housing, differential mechanism in said housing and including an element meshing with said driving element, shafts connecting elements of said differential mechanism and said wheels, and means mounting said differential housing to oscillate substantially about the axis of said driving element, one only of said shafts being connected to its differential element through a universal joint.

13. In an automotive vehicle, a tubular back bone, a propeller shaft housed therein and carrying a pinion, springs independently connecting wheels to said back bone, a differential housing, differential mechanism in said housing and including an element meshing with said pinion, means including a resilient sleeve mounting said differential housing to oscillate about the axis of said pinion, drive shafts connected to said respective wheels through universal joints, and a universal joint connecting one only of said drive shafts to an element of said differential mechanism, the other of said drive shafts being directly connected to an element of said differential mechanism.

14. In an automotive vehicle, a frame, a propeller shaft, a differential housing having a neck and enclosing differential mechanism, a collar carried by said frame and receiving said neck, said housing being oscillable about the axis of said neck, a pinion associated with said propeller shaft and meshing with an element of said differential mechanism, a spring carried on said frame and carrying a wheel-supporting unit, a wheel supported on said unit, a shaft rigidly associated with said housing and operatively connected to an element of said differential, said shaft being operatively connected, through a universal joint, with said wheel, a second spring carried on said frame and carrying a second wheel-supporting unit, a second wheel supported on said second unit, and a shaft operatively connected at one end, through a universal joint, with an element of said differential, and operatively connected, at its opposite end, through a universal joint, with said second wheel.

15. In an automotive vehicle, a substantially tubular back bone, a pair of drive wheels carried on said back bone, drive shafts associated with said wheels, different'al mechanism associated with said shafts, a housing for said differential mechanism, and resilient means in said back bone to support said housing and providing for oscillation of said housing about an axis disposed substantially in the vertical central longitudinal plane of the vehicle.

16. In an automotive vehicle, a substantially tubular back bone, a pair of drive wheels carried on said back bone, drive shafts associated with said wheels, differential mechanism associated with said shafts, a housing for said differential mechanism, and means in said back bone to support said housing and providing for oscillation of said housing about an axis disposed substantially in the vertical central longitudinal plane of the vehicle.

17. In an automotive vehicle, a frame, a pair of drive wheels carried on said frame, drive shafts associated with said wheels, differential mechanism associated with said shafts, a housing for said differential mechanism, and resilient means for mounting said housing on said frame, and providing for free oscillation of said housing about an axis disposed substantially in the vertical central longitudinal plane of the vehicle, and further providing for limited universal movement of said housing with respect to said frame.

18. In an automotive vehicle, a frame, a pair of independently sprung wheels mounted on said frame, differential mechanism, means providing a resilient mounting for fulcruming said differential mechanism on said frame for free oscillation about an axis lying substantially in the longitudinal central vertical plane of said vehicle, means including two universal joints operatively connecting an element of said differential mechanism to drive one of said wheels, and means including only one universal joint operatively connecting an element of said differential mechanism to drive the other of said wheels.

19. In an automotive vehicle, a frame, springs carried on said frame, wheels respectively carried on said springs, differential mechanism, a housing for said mechanism, shafts connecting elements of said mechanism to drive said wheels, respectively, one only of said shafts being connected to its differential element through a universal joint, means on said frame cooperating with said housing and providing a fulcrum upon which said housing fulcrums to swing in a plane substantially transverse to the axis of the vehicle, and a resilient cushion interposed between said housing and said last-named means.

20. In an automotive vehicle, a frame, springs carried by said frame, wheels carried by said springs, the axes of said wheels being entirely below said springs, and means for driving said wheels differentially, comprising differential mechanism carried by said frame and articulated shafts respectively connecting said wheels with separate elements of said differential mechanism, and means associated with said wheels and with said frame and positioned above the axes of said wheels to force said wheels, upon flexure of said springs, to describe arcs having radii at least greater than one-half the tread of the vehicle.

21. In an automobile vehicle, a frame, spring means carried on said frame, wheels respectively carried on said spring means, differential mechanism, a housing for said mechanism, shafts connecting elements of said mechanism to drive said wheels, respectively, one only of said shafts being connected to its differential element through a universal joint, means connecting said frame to said housing permitting it to swing in a plane substantially transverse to the axis of the vehicle, and a resilient cushion interposed in said last-named means.

JULES HALTENBERGER.